Feb. 24, 1925.
M. D. STALDER
JAR PROTECTOR
Filed June 2, 1924
1,527,934
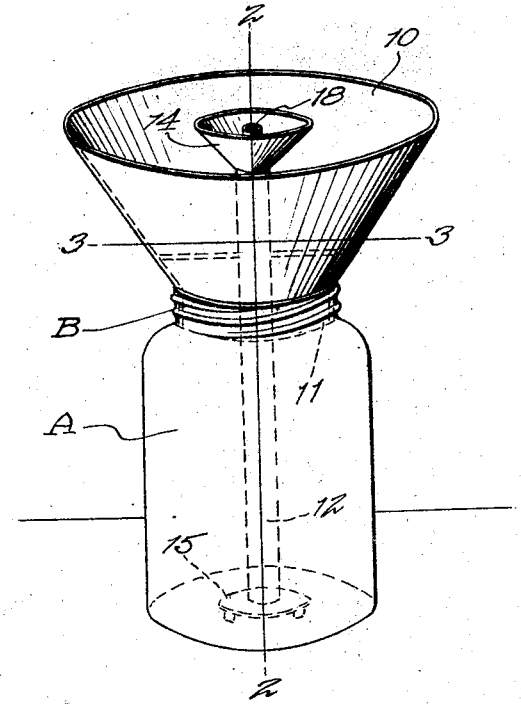
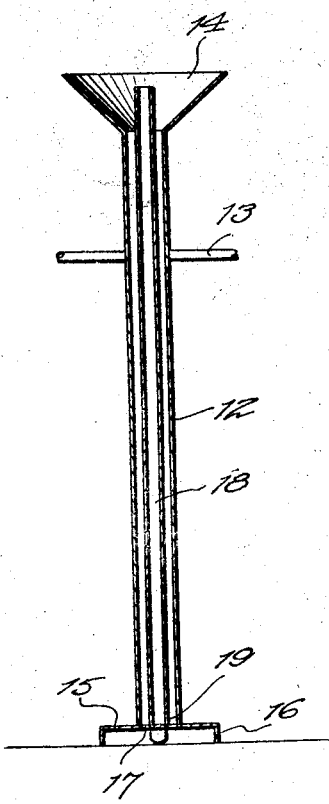
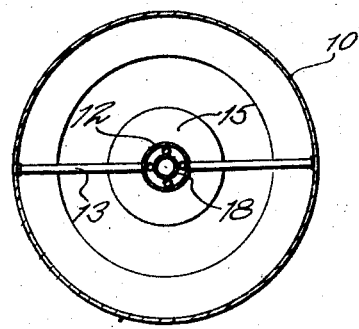
Merle D. Stalder
INVENTOR
BY Victor J. Evans
ATTORNEY Patented Feb. 24, 1925.

1,527,934

UNITED STATES PATENT OFFICE.

MERLE D. STALDER, OF LINCOLN, NEBRASKA.

JAR PROTECTOR.

Application filed June 2, 1924. Serial No. 717,368.

*To all whom it may concern:*

Be it known that I, MERLE D. STALDER, a citizen of the United States, residing at Lincoln, in the county of Lancaster and State of Nebraska, have invented new and useful Improvements in Jar Protectors, of which the following is a specification.

This invention relates to kitchen apparatus and has for its object the provision of a novel device adapted to be engaged in a fruit jar or the like to provide ventilation and to effect cooling so as to prevent breaking of the jar when it is being filled with hot material such as preserves or the like.

It is well known to those experienced in canning fruit, vegetables, or other materials and in making preserves, that the glass jars ordinarily used frequently crack when filled with the hot material. To avoid this it is common practice to place a spoon or similar object in the jar to absorb and conduct away the heat and thus prevent breakage.

As the above mentioned makeshifts are inefficient I have designed the present device which may be easily engaged within a jar and which includes a funnel portion facilitating filling.

Another object is the provision of an attachment of this nature which will be simple and inexpensive to manufacture, easy to use, positive in action, durable in service, and a general improvement in the art.

With above and other objects and advantages in view, the invention consists in the details of construction and arrangement to be hereinafter more fully described and claimed, and illustrated in the accompanying drawings, in which:

Figure 1 is a perspective view of the device in applied position.

Figure 2 is a section on the line 2—2 of Figure 1, with parts omitted.

Figure 3 is a section on the line 3—3 of Figure 1.

Referring more particularly to the drawings, the letter A represents the conventional fruit jar having the usual mouth B. In carrying out the invention, I provide a funnel 10 of suitable size having a depending flange or extension 11 insertable within the mouth B. Extending axially of the funnel is a pipe 12 having opposite arms 13 secured to the funnel and having its upper end 14 flared. At the bottom of this pipe is a disk 15 provided with depending lugs or feet 16 for supporting the disk above the bottom of the jar. Within the confines of the pipe 12, the disk is formed with holes 17.

Within the pipe 12 is a ventilating tube 18 rising from the disk 15 and formed with holes 19 communicating with the pipe and consequently with the space below the disk.

In use, the device is inserted within the jar A with the feet 16 resting upon the bottom thereof. The hot material to be canned is poured into the funnel 10. The disk, pipe and tube operate to absorb and conduct away the heat so that the jar will not crack. Any air in the jar will pass out thru the holes 17 and 19 and thru the tube 18 to the atmosphere, thus avoiding trapping of the air and the formation of air bubbles.

While I have shown and described the preferred embodiment of the invention, it is to be understood that I reserve the right to make all such changes in the form, construction and arrangement of parts as will not depart from the spirit of the invention or the scope of the subjoined claims.

Having thus described my invention, I claim:—

1. A device of the character described comprising a funnel adapted for insertion within the mouth of a receptacle, a pipe secured centrally of the funnel, a disk on the lower end of the pipe having depending lugs and formed with holes within the confines of the pipe.

2. A device of the character described comprising a funnel adapted for insertion within the mouth of a receptacle, a pipe secured centrally of the funnel, a disk on the lower end of the pipe having depending lugs and formed with holes within the confines of the pipe, and a tube within and extending thruout the length of the pipe and communicating with the interior thereof.

3. A device of the character described, comprising a funnel insertable within the mouth of a jar, a pipe within the funnel, arms connecting the pipe with the funnel, a disk on the lower end of the pipe having depending projections and formed with holes within the confines of the pipe, and a ventilating tube rising from the disk and extending axially thereof, the tube having holes therein.

In testimony whereof I affix my signature.

MERLE D. STALDER.